United States Patent [19]
Lewis

[11] 3,841,763
[45] Oct. 15, 1974

[54] METHOD AND APPARATUS FOR MONITORING AND CORRELATING VISIBLE ENVIRONMENTAL CONTAMINATION

[75] Inventor: Robert E. Lewis, Palo Alto, Calif.

[73] Assignee: Timelapse, Inc., Mountain View, Calif.

[22] Filed: June 25, 1973

[21] Appl. No.: 373,026

[52] U.S. Cl.................. 356/207, 356/219, 356/229
[51] Int. Cl. .......................................... G01n 21/12
[58] Field of Search ........... 356/207, 208, 229, 186, 356/191, 201, 219

[56] References Cited
UNITED STATES PATENTS

| | | | |
|---|---|---|---|
| 2,921,497 | 1/1960 | Yant et al. | 356/207 |
| 3,498,721 | 3/1970 | Thorndike | 356/208 |
| 3,554,655 | 1/1971 | Einstein | 356/207 |

*Primary Examiner*—Ronald L. Wibert
*Assistant Examiner*—Conrad Clark
*Attorney, Agent, or Firm*—Schatzel & Hamrick

[57] ABSTRACT

Photographic photometry apparatus and method for pictorial recording of scene brightness and apparatus for reproducing said recordings for evaluation and correlation of the scene brightness. The apparatus and method provides for continuously, automatically monitoring a pollutant source and recording pictorial data of visible environmental contamination. The method and apparatus provide for a permanent pictorial recording of the environmental contamination which further allows for a permanent on-the-spot continuous relative comparison and rating of the degree of contaminants relative to pre-established standards.

19 Claims, 8 Drawing Figures

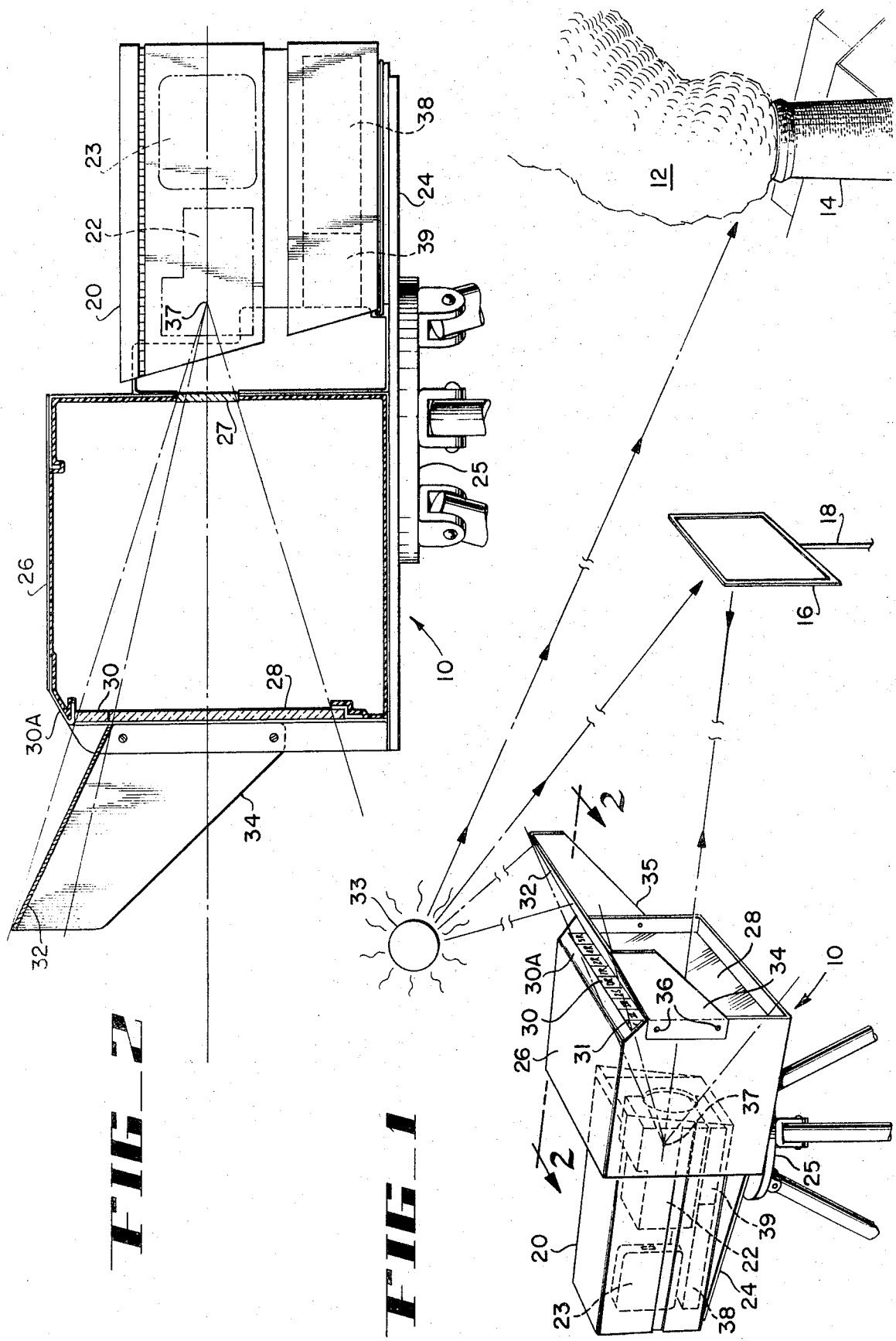

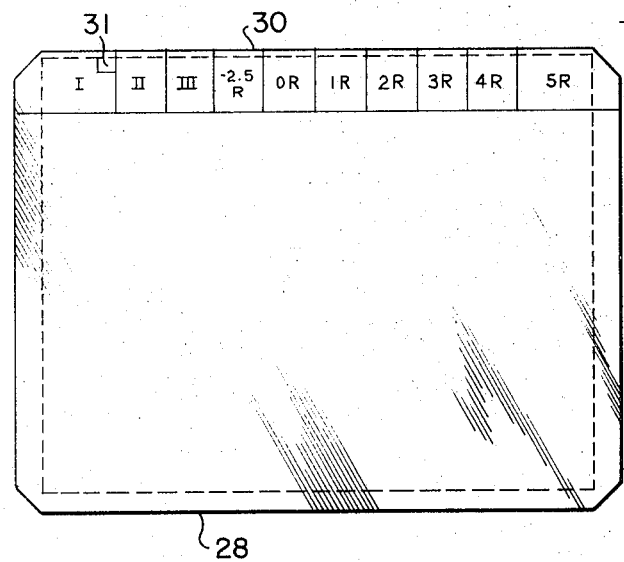
FIG_3
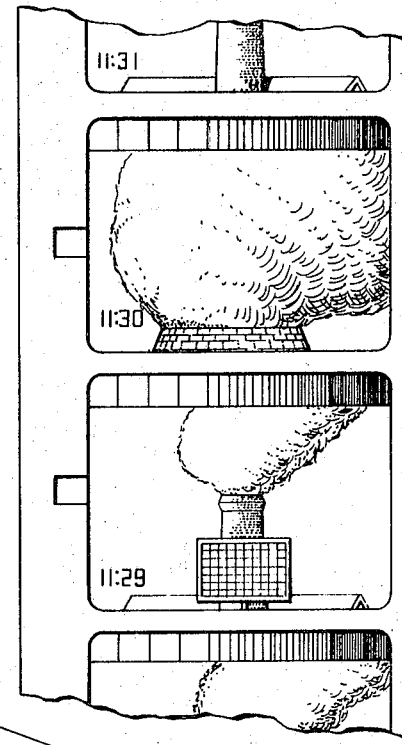
FIG_5
FIG_4
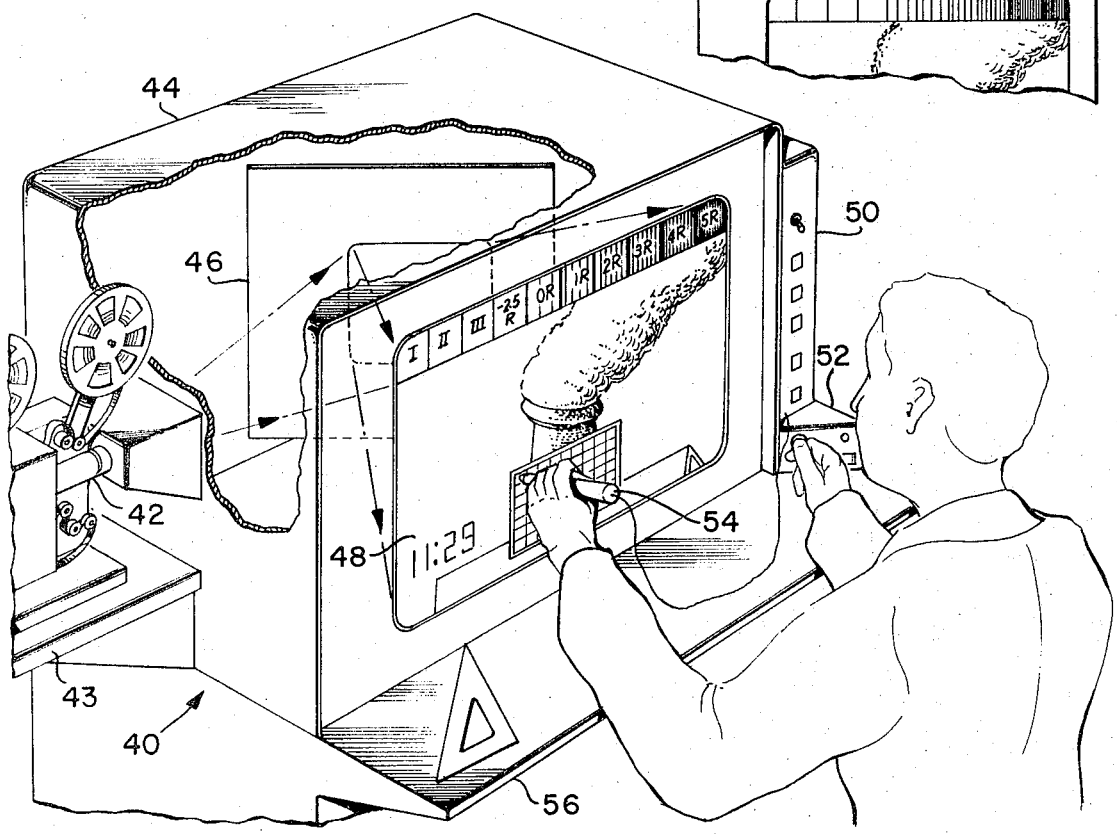

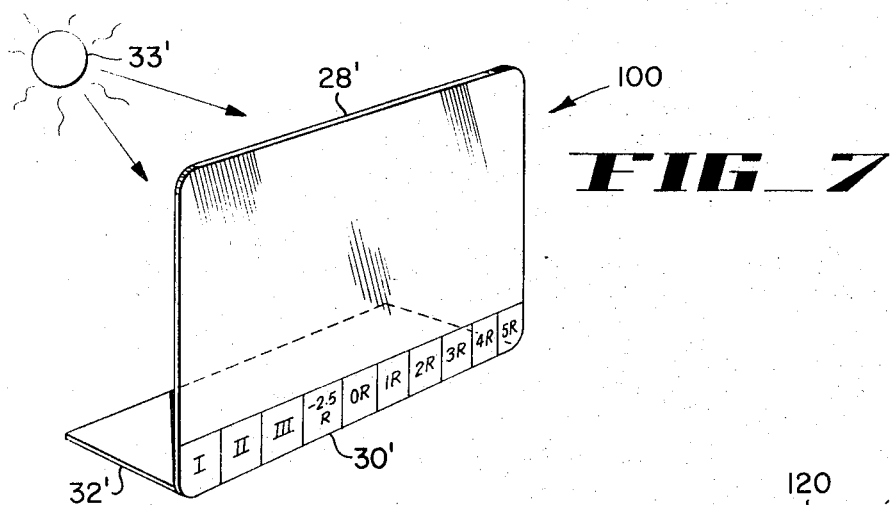
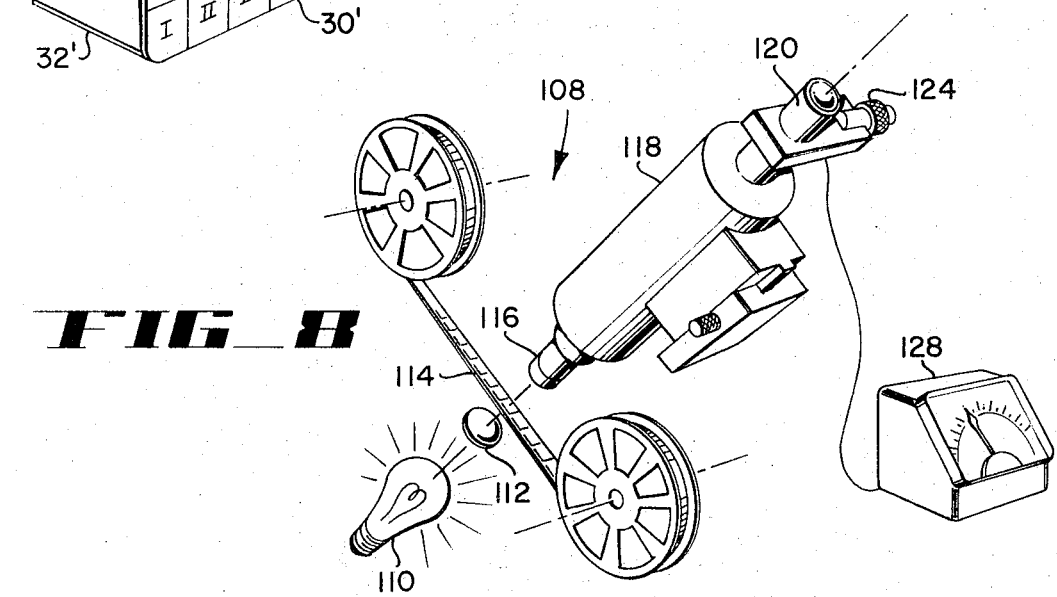
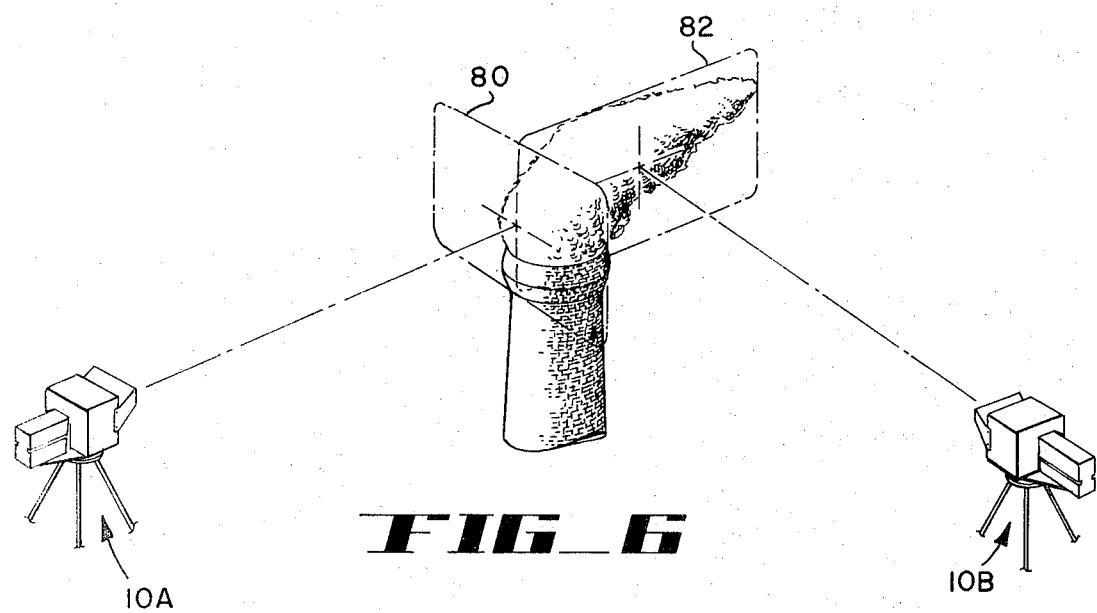

METHOD AND APPARATUS FOR MONITORING AND CORRELATING VISIBLE ENVIRONMENTAL CONTAMINATION

BACKGROUND OF THE INVENTION

1. Field of the Invention

The present invention relates to photographic photometry and pictorial recording of scene brightness. The invention further relates to apparatus and a method for monitoring environmental atmospheric contamination and emission sources and relative measurement of the brightness of the emitted contamination.

2. Description of the Prior Art

The monitoring and measuring of the quantity of environmental atmospheric contaminants emitted from pollution sources has become a prime concern in recent years. For example, as related to air and water pollution, many governmental bodies have established laws, rules and regulations relating to the quantity of environmental contaminants that a source may legally emit during given periods of time. These environmental contaminants are frequently in the form of air and water contaminants emitted by automobiles, industrial complexes, or other pollutant sources. Usually, the contaminants are divided into two classes — particulate matter (either solid or liquid) and various pollutant gases.

Smoke is a particulate pollutant associated with human activity. It is commonly composed of carbon and other substances given off during the incomplete burning of material. In heat application processes such as melting metals, the heating material emits fumes which condense upon reaching the cool atmosphere and form metallic dusts or oxides. Burning fuel in automobiles, diesel trucks and buses, aircraft, and incinerators produces particulate matter. Also, agricultural burning produces particulate matter. Various industrial processes revolve around chemical reactions, e.g. refining crude oil, manufacturing sulfuric acid, etc., which cause particles to form in the atmosphere. Also, liquid aerosols and solid particles are formed photochemically in the atmosphere when sunlight reacts with waste gases. Industrial dust is formed by grinding and pulverizing materials to produce cement, chemicals, fertilizers, pigments, ceramic goods and milled or finished wood products. Various of the gases produced by industry and automobiles cause visibility impairment. Also photochemical air pollution causes visibility reduction.

In conducting environmental protection activities, some contaminant sources are directly regulated by governmental bodies by having pollutant emission limits imposed on the pollutant sources. A common means of evaluation of emitted pollutants is by evaluating the opacity of the emission. The source is then regulated by limiting the degree of permissible opacity of visible contaminants emitted from the source operations.

Determination of whether visible air contaminants emitted from a source are within permissible established limits thus becomes a prime concern to potential pollutant sources, the regulating governing body and the public citizenry. Due to the fact that the degree of contaminants from a given source may vary throughout a given time period, it is desirable to have a continuous surveillance of the source during said period. Also, it is frequently desirable to have a permanent record as to the actual emissions from the source. Said records may be desirable to the operator of the potential pollutant source to evaluate his own facility, to the governmental body assigned the responsibility of regulating and enforcing pollution control standards, and for use by fact finders assigned with the responsibility of determining and judging the facts in a contested dispute relative to the degree of emissions.

Heretofore, visual on-the-spot inspection of the pollutant source and comparison to Ringelmann Smoke Charts has been a widespread method of evaluating the amount of pollutants emitted from a source. Ringelmann Smoke Charts comprise a series of charts relatively numbered from 0 to 5, each of which simulates a smoke density. Charts 1-4, inclusive each comprise a rectangular grid of black lines of definite width and spacing on a white background with each chart of a different number comprising a different percentage of black. The charts provide a series of graduated shades of gray, varying by five equal steps between white and black. A Ringelmann "0" is white and represents a total absence of pollution, a "1" represents the equivalent of twenty percent black or 20 percent absorption of light. A Ringelmann "5" is solid black and represents a 100 percent absorption of light. Ringelmann numbers 2, 3, and 4 are respectively equivalent to 40, 60 and 80 percent absorption of light. These charts may be used in measuring the opacity of smoke rising from stacks and other sources by visually matching, at the source, the actual effluent with the various numbered charts, to compare the effluent with the opacity indicated by the charts. For example, the San Francisco Bay Area Air Pollution Control District uses the Ringelmann Chart System for evaluating smoke opacity. Ringelmann 1 (20 percent opacity) is the present acceptable standard such that, except for three minutes in any hour, a visible plume that obscures an observer's view by more than 20 percent is a violation of the District's regulations. In using these charts, an individual evaluator generally takes a Ringelmann chart and positions the chart in front of him in alignment with the pollutant source. The chart is positioned at a distance wherein the lines merge together to establish a gray appearance. The individual then makes a personal visual comparison as to the opacity of the effluent relative to the chart.

It is apparent that this method of evaluating the smoke opacity has limitations. The method is dependent upon the capability of the individual evaluator doing the on-the-spot evaluation; the method does not provide for a capability of standardization; the method does not provide for continuous monitoring of a potential pollutant source but only provides for periodic checks dependent upon the time schedule of the individual evaluator; and the method does not provide for a permanent pictorial review record of the actual emission. It further is a very costly method in view of the necessity of having a skilled individual personally monitor and evaluate the emission source.

The Ringelmann chart method also has inherent limitations as to accuracy in that the charts represent black or neutral gray emissions against a white background. An environmental white background is rarely the case in modern life where emissions are often brown or other colors and are generally viewed against a background of blue or smoggy tan sky, or against hillsides or structures of various colors. Where airborne pollutants e.g. smoke, are under surveillance, the ever-changing wisps of smoke and air turbulence in such discharges require the observer to exercise unfailing quantitative estimates in addition to the color and background problems in order to arrive at a reasonably accurate reading.

The unavailability of having a continuous monitoring capability using the known prior art methods is of prime concern. Even under ideal conditions, an industrial facility cannot achieve constant surveillance and monitoring of all fume hoods, furnace chimneys, reactor discharges, motor start-ups, gravel dust swirls, etc. during all time periods of operations. Likewise, as a practical matter, regulatory agencies and bodies cannot retain a contant on-the-spot surveillance of a potential pollutant source to detect violations of environmental standards. Therefore, there is a need for a pollutant surveillance system for determining compliance with environmental standards and which system provides for reliable accurate recordings and readings. The system should also preferably be of low operating cost, relatively easy to operate and provide clock-time records.

SUMMARY OF THE PRESENT INVENTION

The present photographic photometry invention provides a method and apparatus for continuous, automatic, quantitative photometric surveillance of scene brightness. In an exemplary embodiment, the method and apparatus provides for the photometric surveillance of environment quality at a given location and provides for a permanent pictorial record of the emissions from a potential pollutant source at said location. The recorded data may be subsequently correlated relative to established standards.

In recording the data, the subject pollutant source is placed under continuous surveillance by pictorial recording apparatus adapted to automatically record pictures of the subject source at select time increments during desired time periods. Concurrently with the recordation of pictures of the source, relative opacity rating charts within the field of view of the recording apparatus are recorded on the same picture as that of the subject source. This provides a record of the subject source and relative rating references pictorially recorded under the same environmental conditions. The recording apparatus may further include a timer which displays the clock time-of-day at the select time increment such that said time may be recorded. Thus, as each picture is recorded, the time of day at which the picture was taken is also recorded as part of the composite recorded data and becomes a permanent part of the recorded data.

The image densities of the recorded pictures may subsequently be evaluated to correlate the emitted pollutant quality relative to the rating charts at each individual time interval through the use of data reduction apparatus. The data reduction apparatus includes pictorial reproduction capability to reproduce the recorded scenes. As known in photometry, the light brightness of a scene is dependent upon the opacity and reflectivity of the subjects of the scene. Accordingly, the data reduction unit includes a photoelectric illuminance reading apparatus to read directly from the reproduced recorded picture the opacity reflectivity characteristics of the pollutant or other subjects relative to the individual rating references recorded on the same series of pictures. This provides data correlation of the recorded images of the subject contaminant source with the reference rating standards without the need of observer estimation. It also provides for subsequent reconfirmation of the data correlation. The recorded time-of-day further provides data to indicate variations, if any, in the opacity-reflectivity characteristics about the pollutant source at various times of the day.

Other embodiments and advantages will be in part evident to those skilled in the art and in part pointed out hereinafter in the following description taken in connection with accompanying drawings wherein there is shown by way of illustration and not of limitation preferred embodiments of the invention.

BRIEF DESCRIPTION OF THE DRAWINGS

FIG. 1 is a view in perspective and partially in section of an automatic photographic surveillance apparatus according to the present invention for continuously and automatically monitoring and recording airborne emissions from an industrial smoke plume;

FIG. 2 is a side-elevational partially sectioned view of the monitoring-recording apparatus of FIG. 1;

FIG. 3 is a front view of a neutral filter plate assembly of the apparatus of FIGS. 1 and 2;

FIG. 4 is a view in perspective and partially in section of a data reduction apparatus according to the present invention for reproducing, evaluating and correlating the recordings of the apparatus of FIG. 1;

FIG. 5 diagrammatically illustrates a film strip section illustrating two successive reproduced recordings of pictures of the environment about the subject industrial smoke plume wherein one frame illustrates a close-up view of the subject pollutant source and the other frame illustrates an immediately preceding recorded frame illustrating the source and a reference chart recorded simultaneously;

FIG. 6 diagrammatically illustrates a system of monitoring and recording the emissions of a source from two different angles to provide for measuring the volume of emissions from a given source;

FIG. 7 illustrates an alternative embodiment of a density filter and light reflector plate for a monitoring-recording apparatus; and FIG. 8 is a schematic view of a microscope type data reduction unit.

DETAILED DESCRIPTION OF THE PREFERRED EMBODIMENTS

FIGS. 1–8 schematically illustrate photographic photometry apparatus of a quantitative monitoring, recording and reproducing system according to the present invention. The illustrated embodiment is adapted for monitoring a source of airborne environmental pollutants. The system provides an automated, time-compression recordings of the pollution about the subject source and reproduction apparatus for reproducing the recordings to permit subsequent and repeated quantitative evaluation and correlation of the quantitative degrees of pollutant images about the subject source.

FIG. 1 illustrates a monitoring and recording apparatus, referred to by the general reference character 10 for monitoring and recording photographs of the smoke emissions 12 from a chimney 14 of an industrial facility. As illustrated in FIG. 1, positioned intermediate the monitoring-recording apparatus 10 and the chimney 14, so as to be in the field of view of the apparatus 10, is a rating chart 16 in the form of a Ringelmann Smoke Chart supported by a support stand 18. The chart is positioned at a distance from the apparatus 10 whereat the lines of the chart merge into shades of grey. In the event that the recording is desired for subsequent use as judicial evidentiary matter, the stand 18 may be supplemented with or replaced by an individual such that both the chart 16 and individual are photographically recorded simultaneously with the chimney 14 and emissions 12. This will permit the individual to subsequently testify and to further verify his personal observation as to the circumstances and conditions under which the monitoring-recording apparatus 10 was operated. In view of the fact that many governmental bodies have established allowable pollutant emissions in terms of Ringelmann standards, the chart 16 provides the simultaneous recording of the Ringelmann standards at the same surroundings and under the same conditions as the subject source under surveillance.

The monitoring-recording apparatus 10, which is further illustrated in a side-elevational, partially-sectioned view in FIG. 2, includes a film handling and camera control box 20 with a camera lens and optics section 22. The camera also includes a film handling section 23 which may support a film cartridge on which the pictures are recorded. The camera 20 is supported by a support platform 24 supported in an elevated position by an adjustable tripod support 25. For example, the camera 20 may be in the form of a super 8-mm cartridge-loading motion picture camera of which the advancement of the film taking of pictures is controlled to record pictures in successive time increments, e.g. one frame per second, one frame per four seconds.

An enclosed light-shield box 26 is supported about the front of the lens section 22. The box 26 has non-reflective (black) interior coated walls. The box has an opening 27 adapted to fit about the front side of the camera box 20 and encompassing the lens 22 such that the interior of the box 26 is not within the field of view of the camera medium 20. The box 26 includes a light filter plate 28 (further illustrated in FIG. 3) of glass or such. The plate 28 is positioned to be within the field of view of the camera medium 20 intermediate the camera lens and subject to be recorded. Thus, all recorded pictures are taken through the filter plate 28. About the top peripheral edge of the filter plate 28 is a row of optical filters in an arrangement 30 which extend to the edge of a truncated exterior surface 31 of the box 22. The plane of the surface 31 establishes an acute angle relative to the vertical plane of the reference filter arrangement 30. The illustrated arrangement 30 includes ten separate rectangular shaped filters designated I, II, III, −2.5R, OR, 1R, 2R, 3R and 5R, respectively, in a common vertical plane and in lateral tandem lateral alignment across the top peripheral edge of the plate 28. Each of the filters −2.5R to 5R inclusive are of a neutral density and different shade of grey to establish a step wedge filter. The filters OR–5R are of shades of grey corresponding to the Ringelmann 0 – 5 rating charts respectively. The filter designated −2.5R is clear glass and the filters I, II and III are respectively red, green and blue, or other colors to calibrate color rendition of the photographic system where color film is used. The filters 0 to 5R inclusive may be comprised of clear glass with coatings of optical thin films superimposed thereon to establish the differing shades of grey.

The filter arrangement 30, by inclusion of the filters I, II, III and −2.5R provides for an extended rating range over that of the Ringelmann charts. A standardization constant reference light source 31, e.g. light emitting diode, is included in the area of the filter I to improve the data reduction capabilities of monitoring-recording apparatus using automatic exposure control cameras wherein the resultant image density of the recorded picture is a function of the photographic D Log E response curve of the film as processed, thus indicating the relative aperture "T" stop for a given photographic material and scene type. It is known that with various cameras, when the camera is directed at a dark object, the camera automatically changes exposure to make a better picture. For example, it has been shown that when a large volume of black smoke exists which covers the majority of the field of view, that an automatic exposure control will open the lens iris to compensate for the lowered light average going to the film. As a result, the smoke is lightened and derated. Implementation and inclusion of the internal constant reference light 31 provides a stable reference light and correction of induced data bias which may result from darkened environmental light conditions. The reference light 31 similarly compensates for those situations where a passing cloud obscures the scene. Table I details the densities and ratings of one set of filters of chosen densities.

TABLE I

| Filter Space | Ringelmann Smoke Chart Number | Transmission | Actual Optical Density | Pseudo Density | Pseudo Transmission |
|---|---|---|---|---|---|
| −2.5R | −2.5 | 100% | 0 | N.A. | N.A. |
| OR | 0 | 50% | 0.301 | 0 | 100% |
| 1R | 1 | 40% | 0.398 | 0.097 | 80% |
| 2R | 2 | 30% | 0.523 | 0.222 | 60% |
| 3R | 3 | 20% | 0.699 | 0.398 | 40% |
| 4R | 4 | 10% | 1.000 | 0.699 | 20% |
| 5R | 5 | 0 | Infinity | Infinity | 0% |

In further explanation of the filter arrangement 30, a difficulty with the accuracy of the Ringelmann Smoke Charts may occur when the illumination level behind the emission source exceeds that of the white solar reflection plate. When this arises, there is what is referred to herein as a "whiter than white" condition. This condition may be due to shifting cloud cover, or mirror-like reflections in the background, such as aluminum paint on a building roof. To encompass this span of light level range, the filter arrangement 30 according to Table I and made as illustrated in FIGS. 1–3 incorporates a bias of 50 percent or 2.5 Ringelmann rating. This places the filter space OR at the same density as the filter glass 28. Space −2.5R therefore passes more light than the main scene or bias filter 28 thereby providing brighter reference areas. If the operator is not aware of this bias, and filter −2.5R were covered so as not to reveal the bias, as the filter 1R matches the No. 1 Ringelmann Smoke Chart, it would be assumed that the optical density and corresponding transmission were 0.097D and 80 percent respectively as in common with smoke rating filters. Due to the added range by the bias, these are considered "pseudo" values.

Various modifications and adaptations may be made. For example in addition to the neutral density set of reference filters or the so-called "step-wedge," the color step wedges I, II and III may be added to standardize color transfer.

The neutral density bias of Table I designation may be replaced by a filter without neutral characters, as for example one which has spectrophotometric transmission for augmenting relative infrared sensitivity of infrared color film (formerly referred to as camoflage recognition color film). Other selections of narrow bandpass, high pass, low pass and color correction-type filter curves are applicable. The bias of Table I may also be used with color filters used on the optic section 22, as for example, increasing contrast of haze, rather than eliminating its effect as is commonly done by use of the Wratten type 1A filters.

As described, the filter 28 and filter arrangement 30 have been shown as positioned a small distance in front of the camera lens. At these positions the depth of focus allows effective use if care is taken to avoid measurement in the poorly resolved boundaries between spaces. In practice, these have been used with cameras incorporating a zoom lens going from 7 to 56 mm effective focal length (EFL) with a maximum relative aperture opening size of $f/1.8$ fitted with single lens reflex focus and through the lens automatic photo-cell controlled exposure on super 8-mm cartridge loaded film. Embodiments using the step-wedge filter arrangement 30 at 7-mm EFL have been found to date to allow the widest field of view for terrain identification, sky clouding and shadows. In the event this wide angle surveillance reveals a subject lacking in desired detail, zoom to a longer EFL allows magnification under the calibrated scene conditions established at 7-mm EFL which includes the filter step-wedge.

The filter arrangement 30 is lighted by a white upper surface reflection plate 32 for reflecting and diffusing the rays of an illuminance source 33. For outside activities, the illuminance source 33 may be the sun. In operation, the upper surface of the plate is positioned to be in facing alignment with source 33 so as to intersect light rays projected therefrom. The neutral density filters of the arrangement 30 are illuminated by the illuminance source, e.g. the sun, to provide matching of the subject under surveillance to the various shades of the filter arrangement. The transmission step-wedge arrangement 30 is devoid of specular reflectance of illuminance source 33 to the optics section 22. Accordingly, it provides for more readily reproducible readings than that of reference charts, e.g. the chart 16 which often includes ink gloss errors in the recordings. The neutral filters −2.5R to 5R inclusive may be viewed as a step-wedge-type filter where adjacent filters have a different degree of absorption of light with the absorption of the filter −2.5R minimum and that of 5R maximum. In view of the fact that Ringelmann chart standards are established based on a white background, the plate 32 provides a white background for the filters. The reflector plate 32 is supported about the front of the filter plate 28 with the edge of the plate parallel to and adjacent the lower horizontal edge of the filter arrangement 30. The plate is supported by means of a pair of support arms 34 and 35. The support arms are joined to the side walls of the box 26 by fastening pin means 36. The plate 32 is positioned at an angle such that the top edge of the plate is in alignment with the top edge of the filters arrangement 30 and the center of the camera optics as illustrated by the point 37. Accordingly, the plate 32 is positioned to block out the pollutant subject from the field of view of the step-wedge filter arrangement 30 such that the filter arrangement 30 provides a reference which is independent of the brightness of the subject itself. The lower surface of the plate 32 is black to provide conventional sunshade action for the filter 28 and camera optics. The positioning of the plate 32 about the top of the field of view and the truncated surface 31 of the box 22 provide for maximum intersection of the illuminance source without apparatus shadowing.

The pictorial recording apparatus 20, being in the form of a motion picture camera, is adapted to record successive sequential pictorial views of the scene. The apparatus 20 further includes an incremental clock control network 38 such that pictorial recordings of the scene are made in successive, sequential time increments as established by the control network 38, e.g. one picture per second, one picture per minute, etc., or conventional motion pictures. Thus, repeated pictorial recordings may be made on the film for subsequent development and reproduction. The reproduced pictures thus provide incremental data samplings of the pollutant source. Various governmental standards have established short-time-period exceptions such as three minutes per hour, in which the pollutant quality emissions from a source may exceed the otherwise established maximum. Thus, it is desirable to record the time at which each picture is taken. This provides data to permit determination as to whether or not the exception has been exceeded. A digital clock unit 39 is further included which illustrates the time of day at preselected time increments and projects the time illustrations into the scene image.

For night-time data recording, illumination from the moon or stars is reflected by the plate 32. However, local lighting, passing automobiles and the like may make it necessary to provide auxiliary and fully controlled lighting for the reflecting plate or equivalent via a light box.

Systems of the present invention also operate with other lens focal lengths, relative apertures and film sizes such as 16-mm, 35-mm, 2¼ × 2¼ (120–620 roll) 56-mm, 70-mm, 4 × 5 inch, 9cm × 12cm, 8 × 10 inch and aerial reconnaisance films and cameras.

In the event that sharply defined filter edges are required, or filter shapes made to fine line match of some scene profile, the present system is operative wherein the scene is imaged directly on the filter and re-imaged by relay optics onto the film.

FIG. 4 illustrates a data reduction unit referred to by the general reference character 40. The unit 40 is adapted such that where a photographic camera is used and after the film is developed, the film may be played back and the recorded scenes reproduced for analyzation and evaluation. The unit 40 includes a movie film projector 42 supported on a base 43. The unit 40 is adapted such that the pictorial recording is projected on a rear projection screen arrangement. The projection screen arrangement includes an enclosed direction box 44 supporting a light beam reflector 46 positioned within the box 44 to intersect the projected beam of the projector 42 and reflect the beam at an angle of ninety degrees relative to the line of direction from the projector 42. The reflector 46 directs and projects the reproduced image onto the rear side of a viewing screen 48. The plane of the screen 48 is positioned substantially parallel with the direction of the beam initially projected from the projector 42. Thus, the reproduced images of the recorded scene may be viewed on the screen 48 for evaluation. The data reduction unit 40 further includes a photometer network 50 to read projected pictorial frames selected by a frame count and control box 52. The control box 52 controls the projector 42 such that select frames may be projected on the screen 48 for select time periods for evaluation. An illuminance reading device in the form of a photoelectric photometer cell 54 is electrically engaged to the circuit network 50. The probe 54 is adapted for grasping and manipulation by an individual such that the tip may be placed at any desired spot on the screen 48 to read the illuminance characteristics at any spot of the reproduced scene image and reproduced views of the filters of the filter arrangement 30. The tip of the probe may be placed on the images of the pollutant source and on the chart image to acquire data which is then correlated by the logic network 50. The reproduced recordings of the neutral density filters provide reference calibration levels of reproduction of the subject under surveillance to make the system photometrically quantitative. The incorporation of the photo cell 54, when corrected to the human visual response curve, allows for photometric reading of color pollutants in terms of the grey scale. This function is otherwise difficult for human eye matching unless the grey scale is replaced by matching color shades. A reference ledge 56 is positioned along the front edge of the enclosure 44 to serve as a reference for aligning triangles, overlay grids and other instruments for relative geometric measurement of events illustrated by the projected images. Thus, the use of the rear image enclosed unit 40 allows for room light use while allowing marking or tracing vellum to be placed over the screen for marking or tracing plume size, etc. of the reproduced, pictorial recording. It further allows for readings with a photometer against the screen and thus keeping out the room light. The system thus provides the capability of making a frame-by-frame evaluation of the recorded emissions source and a correlation to predetermined standards.

As illustrated in FIG. 5, successive exposures reproduced on the screen 48 from the same piece of film, video tape or other recording medium 60, may illustrate a subject pollutant source and a reference chart supported simultaneously in the immediate proximity of the pollutant source. As illustrated in FIG. 5, successive recordings may be zoomed in on the subject source to provide a greater detailed recording. Further, the time of day is printed on each exposure to record further data per picture. The time-of-day recording may originate with the digital clock network 39 associated with the camera apparatus 20. Thus, the reproduced data on the screen provide evaluation relative to established Ringelmann charts and the time of day.

FIG. 6 diagrammatically illustrates an arrangement for measuring the volume of pollutant emissions from a given source. Two monitoring-recording units 10A and 10B are positioned and directed to record the source at differing angles. The field of view of the apparatus 10A views the source within a frame 80 and the field of view of the apparatus 10B views the source within a frame 82. In reproducing the recorded frames in the data reproduction unit 40, the projected areas may be measured and the volume calculated. The geometric effects of the cameras departing from the perpendicular and the effective use of additional cameras are demonstratable geometrically with data reduction principles. Clock time imprints on the recordings of each of the units 10A and 10B enable the matching of frames with greater precision.

FIG. 7 illustrates an alternative view of a filter-light reflector plate referred to by the general reference character 100. The structure 100 includes the placement of the neutral density filters 30' about the lower edge of the filter 28' with the white reflector plate 32' about the lower horizontal edge of the filters. This places the plate 32' further from the filter than in the arrangement of FIG. 1 thereby providing less likelihood of interference with the field of view of the camera. Further, equipping the camera with variable focal length lens, zoom settings enable photography through the filter at longer focal lengths without viewing the plate 32' or the neutral density step-wedge filters in all exposures.

FIG. 8 illustrates an alternative embodiment of a data reduction unit referred to by the general reference character 108. The unit 108 is a portable data reproduction-reduction unit having a lamp 110 and associated optics 112 adapted to illuminante the photodata record film 114. The data recorded on the film is imaged by objective lens 116 and focused by a microscope-body and focus-rig 118 to be seen through eyepiece optic assembly 120 by an observer. The eyepiece optic assembly 120 includes a movable stage 124 which positions a small sensor in the field of view and indicating the photometric readings on a meter 128.

Other embodiments of the present invention may include mobile units, e.g. for monitoring highway vehicles. In this event, the apparatus may be mounted within an automobile. A single or plurality of grey reference objects, e.g. spheres or plates may be mounted on the hood or the monitoring vehicle. Said objects are positioned within the field of view of the recording apparatus. As such, when the monitoring vehicle is on patrol and a potential pollutant vehicle is detected, the monitoring vehicle may be positioned such that the exhaust stack of the vehicle under surveillance is in alignment with and in the field of view of the recording apparatus. On the spot recordings may then be made of the emissions from the vehicle under surveillance. By using a video tape recorder, the recordings may be immediately played back and evaluated. In the event the permissible pollutant limits are exceeded, a citation may be executed on the spot. Such system is highly desirable for on-the-spot monitoring of the emissions of diesel powered mobile vehicles.

While, for the sake of clearness and in order to disclose the invention so that the same can be readily understood, specific embodiments have been described and illustrated, it is to be understood that the present photographic photometry invention is not limited to the specific means disclosed. It may be embodied in other ways that will suggest themselves to persons skilled in the art. It is believed that this invention is new and all such changes as come within the scope of the following claims are to be considered as part of this invention.

What is claimed is:

1. Photographic photometry apparatus for pictorial recording of scene brightness comprising, in combination:

a photographic camera means adapted to photograph a scene simultaneously with photographing a light opacity reference means, and recording said photograph on a recording medium;

an enclosed light-shield box supported about the lens opening of the camera means, said box providing a substantially non-reflective interior enclosure and supporting a scene light filter assembly about the front of the lens opening and intersecting the field of view of the camera means, said scene light filter assembly including a neutral density light filter in line with the camera means optics and adapted to be aligned with a subject to be recorded;

a light reflection plate means positioned about the exterior of the light-shield box adjacent to said light filter assembly, the light reflection means being positioned with the surface of the light reflection means intersecting a portion of the field of view of the camera means and in facing alignment with an illuminance source to diffusely reflect illuminance rays from the source to within the enclosed light-shield box; and a light opacity reference means of a plurality of neutral density mediums of varying degrees of light absorption, the light opacity reference means being positioned to intersect the field of view of the camera means and in alignment with the illuminance rays of the illuminance source reflected to the camera means optics through the enclosed light-shield box.

2. The photographic photometry apparatus of claim 1 wherein the light opacity reference means includes a plurality of individual reference neutral density optical transmission filters of varying degrees of absorption positioned about a peripheral edge of the scene neutral density light filter, the plane of said reference filters intersecting the field of view of the camera means and the path of reflected rays of the reflection plate directed to the camera means optics; and the light reflection plate means includes a diffusely reflecting white surfaced medium positioned at an acute angle relative to said plurality of reference filters to intersect the field of view of the camera through said plurality of reference filters.

3. The photographic photometry apparatus of claim 2 wherein the plurality of light reference filters include individual filters of shades of grey corresponding to Ringelmann Smoke Chart standards.

4. The photographic photometry apparatus of claim 3 wherein the light opacity reference medium further includes a plurality of color density filters positioned to intersect the field of view of the camera means and the path of reflected rays of the reflection plate means directed to the camera means optics.

5. The photographic photometry apparatus of claim 2 wherein

The photographic camera means is in the form of a motion camera having a clock-time control network for controlling the clock-time increments at which the camera successively pictorially records the pictorial scene and light opacity reference means within the field of view.

6. The photographic photometry apparatus of claim 5 wherein the photographic camera medium further includes a time-of-day timer for continuously monitoring the time of day; and means for photographically imprinting within the pictorial records, the time-of-day at which each pictorial record of the scene is recorded.

7. The photographic photometry apparatus of claim 6 wherein the photographic camera means is in the form of a super 8-mm, cartridge-loading motion camera.

8. The photographic photometry apparatus of claim 4 wherein the photographic camera means is in the form of a motion camera having a clock-time control network for controlling the clock-time increments at which the camera successively pictorially records the pictorial scene intersecting the field of view; and the plurality reference filters are located about the top peripheral edge of the light filter assembly, each of said reference filters having distinct visible peripheral lines such that the pictorial recordings of each of said individual reference filters reproduce recordings of said lines.

9. The photographic photometry apparatus of claim 2 wherein the reference filters of the opacity reference means are positioned in a common vertical plane in tandem lateral alignment across the top peripheral edge of said scene light filter assembly;

the light reflection plate means is positioned with the edge extending laterally across the opacity reference means adjacent to the top peripheral edge of said scene light filter assembly, and wherein the enclosed light-shield box has a tapered truncated planar surface within a plane extending at an acute angle relative to said vertical plane of the reference filters, said truncated surface extending from adjacent the top peripheral edge of said reference filters.

10. Photographic photometry system apparatus for successive, incremental pictorial recording of a scene brightness and reproduction of the pictorial recordings for evaluation and correlation of the scene brightness, said system comprising in combination:

a photographic camera means adapted to photograph a scene simultaneously with photographing a light opacity reference means;

an enclosed light-shield box supported about the lens opening of the camera means, said box providing a substantially non-reflective interior enclosure and supporting a scene light filter assembly about the front of the lens opening and intersecting the field of view of the camera means, said scene light filter assembly including a neutral density light filter in line with the camera means optics and adapted to be aligned with a subject to be recorded;

a light reflection plate means positioned about the exterior of the light-shield box adjacent to said light filter assembly, the light reflection means being positioned with the surface of the light reflection means intersecting a portion of the field of view of the camera means and in facing alignment with an illuminance source to diffusely reflect illuminance rays from the source to within the enclosed light-shield box; and a light opacity reference means of a plurality of neutral density mediums of varying degrees of light absorption, the light opacity reference means being positioned to intersect the field of view of the camera means and in alignment with the illuminance rays of the illuminance source reflected to the camera means optics through the enclosed light-shield box;

data reduction means for receiving said recording medium and reproducing visible reproductions of the scene and light opacity reference means as recorded on said recording medium by said photographic camera means;

a photocell means for reading the degree of brightness level of the visible reproductions, said photocell means being movable about the surface of the visible reproductions, the photocell means further providing relative illuminance readings as the photocell is moved to various locations of the reproduced pictorial recordings.

11. The apparatus of claim 10 wherein
the light opacity reference means includes a plurality of individual reference neutral density optical transmission filters of varying degree of absorption positioned about a peripheral edge of the scene neutral density light filter, the plane of said reference filters intersecting the field of view of the camera means and the path of reflected rays of the reflection plate directed to the camera means optics;

the light reflection plate means includes a diffusely reflecting white surfaced medium positioned at an acute angle relative to said plurality of reference filters to intersect the field of view of the camera through said plurality of reference filters; and the photocell means being movable about the surface of the visible reproductions of recorded scene and light opacity reference means, said photocell means providing relative illuminance readings as the photocell is moved to various locations of the reproduced pictorial recordings of the scene and light opacity reference means.

12. The apparatus of claim 11 wherein
the photographic camera means is in the form of a motion camera having a clock-time control network for controlling the clock-time increments at which the camera successively pictorially records the pictorial scene and light opacity reference means within the field of view;

the data reduction means further includes a moving projector for successively reproducing visible reproductions of frames of recorded data, a speed control network for controlling the speed at which successive frames of recorded data are reproduced, the speed rate of said control network being independent of the rate at which the frames were recorded.

13. The apparatus of claim 12 wherein
the data reduction means includes a rear screen projection box including an enclosure positioned about the moving projector, a directional reflector within said box positioned at an angle intersecting the axis of the projector beam and reflecting the projected beam onto the back-side planar surface of a screen supported by said enclosure, said photocell means being movable about the front-side planar surface of the screen to detect illuminance readings of the reproduced pictorial recordings of the scene and light opacity reference means.

14. The apparatus of claim 13 wherein
said enclosure further includes a reference ledge about the front-side surface of the screen for supporting measurement instruments for measuring the dimensional characteristics of the reproduced scenes.

15. The apparatus of claim 13 wherein
the photographic camera include zoom lens for recording close-up views of the subject of the scene at select increments.

16. Method for monitoring and rating pollution emissions from a pollutant source, the method comprising the steps of positioning a camera means in alignment with a subject pollutant source with the subject pollutant source within the field of view of the camera;

positioning a light opacity reference medium within the field of view of the camera;

directing illuminance light rays originating from outside the field of view of the camera against the opacity reference medium and directing said rays to the camera optics;

simultaneously recording on a recording medium pictorial views of the subject pollutant source and the opacity reference medium;

reproducing on a common medium the recorded pictorial views of the subject source and opacity reference medium;

reading the relative brightness levels of the reproduced views of the subject source and opacity reference medium.

17. The method of claim 16 including the step of recording successive pictorial views of the subject pollutant source and the opacity reference medium at select time increments; and then successively reproducing on said common medium the pictorial views of the subject source and light opacity reference medium.

18. The method of claim 17 wherein the light opacity reference medium includes a plurality of neutral density mediums of varying degrees of light absorption corresponding to Ringelmann Smoke Chart standards.

19. The method of claim 17 wherein a constant reference light source is provided adjacent to the neutral density mediums to correct for induced bias resulting from darkened environmental light conditions.

* * * * *